Patented Aug. 7, 1951

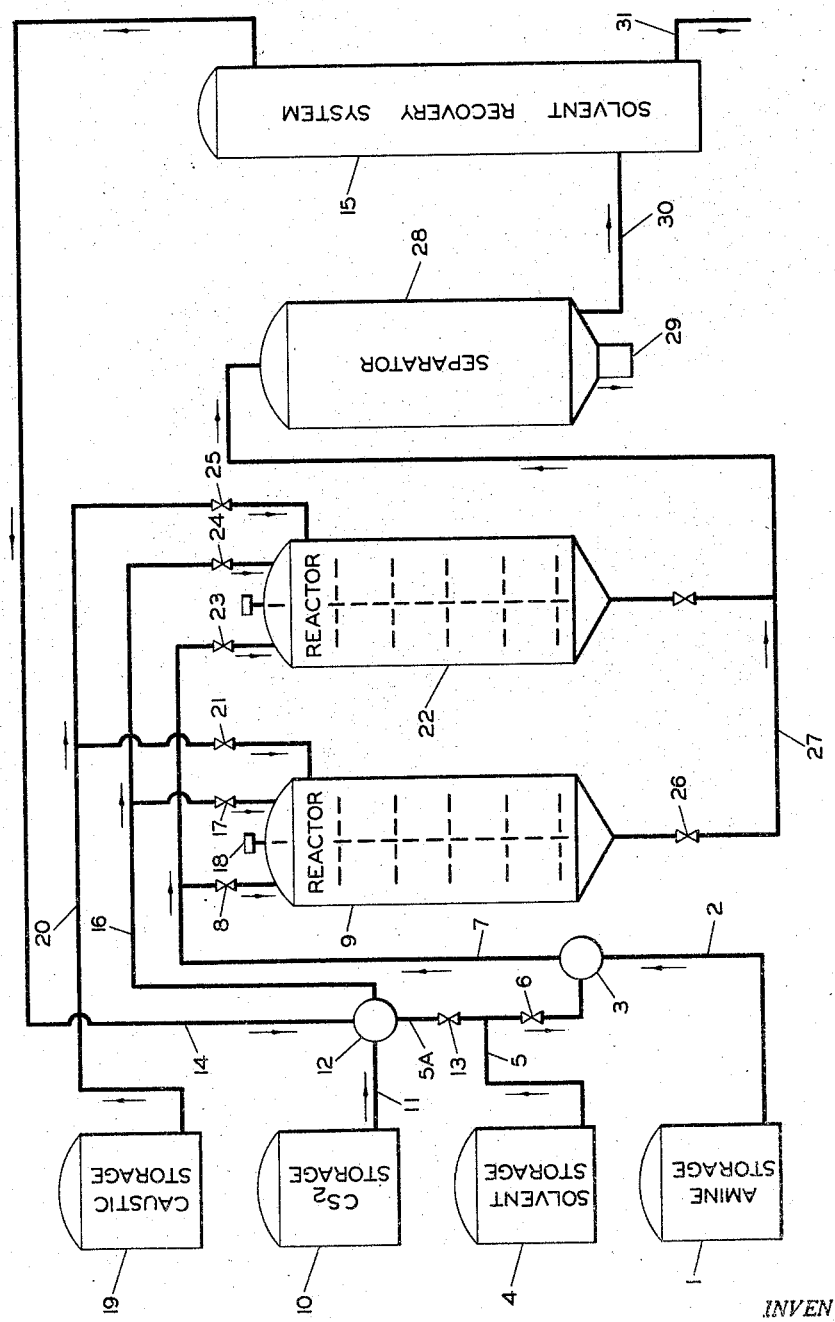

2,563,007

UNITED STATES PATENT OFFICE 2,563,007

PRODUCTION OF ALKALI METAL SALTS OF N-SUBSTITUTED DITHIOCARBAMIC ACIDS

Willie W. Crouch, Bartlesville, Okla., assignor to Phillips Petroleum Company, a corporation of Delaware Application August 25, 1947, Serial No. 770,526

14 Claims. (Cl. 260—247.1)

This invention relates to N-substituted alkali metal dithiocarbamates. More specifically it relates to an improved process for the manufacture of the alkali metal salts of N-substituted dithiocarbamic acids, are of increasing importance secondary amines, carbon disulfide, and an alkali metal hydroxide wherein the said N-substituted alkali metal dithiocarbamates are produced continuously, and the reactions involved are effected in a medium comprising a selected organic solvent.

The salts of dithiocarbamic acids, and particularly the alkali metal salts of N-substituted dithiocarbamic acids, are of increasing importance in the chemical industry. A particularly important application for these compounds lies in their use as shortstopping agents for polymerization processes involved in the production of synthetic rubber. They also have numerous potential uses as intermediates in the production of valuable organic chemicals.

Since dithiocarbamic acids in general are unstable substances, the production of their salts is necessarily effected by indirect means. Clifford and Lichty, J. Am. Chem. Soc., 54, 1163 (1932), describe the preparation of N-substituted sodium dithiocarbamates from the interaction of water soluble amines in aqueous solution with carbon disulfide to form the substituted ammonium salts of the corresponding N-substituted dithiocarbamic acid, adding sufficient water to dissolve the said substituted ammonium salt and treating the resulting solution with a relatively dilute (10 per cent) aqueous solution of sodium hydroxide in the presence of a further amount of carbon disulfide. The reactions involved are as follows:

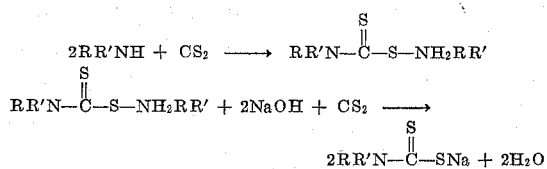

where R is an alkyl group and R' may be either hydrogen or another alkyl group.

However this method is applied to water soluble amines and is inapplicable except in those instances where the substituted ammonium salt is water soluble. Obviously in operating with amines such as cyclohexyl amine where the cyclohexyl ammonium dithiocarbamate is only about 0.4 per cent water soluble or with n-dodecyl amine whose ammonium dithiocarbamate is less than 0.1 per cent water soluble the process is highly impractical. In fact, in most cases, the sodium dithiocarbamate is obtained in solution in a relatively large volume of water from which its extraction as a crystalline salt can be effected only by laborious processes and often with substantial losses from decomposition. While for some purposes the aqueous solutions may be employed directly without removal of the water, such operations involve excessive handling and transportation costs.

One method by which these difficulties might be overcome would appear to lie in treating the amine directly with carbon disulfide and subsequently adding the alkali metal hydroxide, in the solid state. However the reaction between an amine and carbon disulfide proceeds violently, often almost explosively, and such operation is obviously impractical. Furthermore little, if any, reaction results when the solid hydroxide is added. Another method might appear to lie in conducting the reactions in alcohol in which amines, carbon disulfide and alkali metal hydroxides are mutually soluble. However when operating in this manner the product remains in solution in the alcohol and must be removed by a laborious evaporation process attended by similar disadvantages to those mentioned above when carrying out the reaction in water. Furthermore a competing reaction often occurs between alcohol, amine, and the alkali metal hydroxide to form xanthates, etc. Hydrocarbon solvents operate successfully as a medium for the production of the substituted ammonium dithiocarbamate but since the alkali metal hydroxide has no solubility in such a medium, the reaction proceeds with difficulty if at all and attempts to employ an aqueous solution of the said alkali metal hydroxide invariably leave a water phase which retains in solution a major portion of any N-substituted dithiocarbamates which may be formed together with unreacted hydroxide.

The principal object of the present invention is to provide an improved process for the production of alkali metal salts of N-substituted dithiocarbamic acids. Another object is to provide an improved process of making such compounds from amines, carbon disulfide and an alkali metal hydroxide. Another object is to provide a continuous process for making such compounds. Another object is to provide a process of the foregoing type which simplifies recovery and purification of the product. Many other objects will more fully hereinafter appear.

The accompanying drawing portrays diagrammatically one arrangement of equipment useful for carrying out the present invention.

I have now discovered a process for the production of the alkali metal salts of N-substituted dithiocarbamic acids wherein the reactions proceed smoothly to provide substantially quantitative yields of crystalline product. By the method of my invention the interactions of an amine selected from the group consisting of primary and secondary alkyl and cycloalkyl amines with carbon disulfide and an alkali metal hydroxide are effected concurrently in a solvent of such a nature that the difficulties heretofore encountered are substantially eliminated. When operating in this manner the substituted ammonium salt of the N-substituted dithiocarbamic acid forms as a suspended crystalline precipitate which subsequently changes to the crystalline alkali metal salt, in what is apparently a direct solid to solid transformation.

The solvent media employed in my process are of such nature that mutual solubility is provided for the amine employed and for the carbon disulfide but the solubility for the product is negligible. They are chemically inactive with respect to both reactants and product and have at least a limited solubility for water. Examples of solvents which are suitable for use in the practice of my invention are aliphatic ethers such as diethyl ether, diisopropyl ether, di n-propyl ether, di n-butyl ether, diisobutyl ether, di-t-butyl ether, the various diamyl ethers, etc.; aliphatic ketones such as acetone, methyl ethyl ketone, diethyl ketone, diisopropyl ketone, di n-propyl ketone, ethyl n-propyl ketone, ethyl isopropyl ketone, etc. Any organic solvent which meets the requirements of: (1) mutual solubility for the amine and carbon disulfide, (2) chemical inertness (3) at least limited solubility for water and (4) substantial insolubility for the product; may be employed. The lower aliphatic ethers and ketones or other families of solvent are preferred because as is well known the solubility of water in a solvent of a single family (such as ethers or ketones) decreases with increasing molecular weight since as one goes higher in a given homologous series the properties become more and more like those of the corresponding hydrocarbons. Preferably the solvent employed is one which is capable of dissolving at least 0.5 per cent of water at room temperature say 20° C. The reasons for the requirement of at least limited solubility for water are not known with certainty but may be due in part to a necessity that the alkali metal hydroxide must go into solution in the solvent medium at least to a limited extent in order that the reaction desired proceed and solubility of the alkali metal hydroxide in the mutual solution of amine and carbon disulfide in the solvent is assured if the solvent has limited solubility for water, since if a solvent is capable of dissolving water it is also capable of dissolving alkali metal hydroxide. Alcohols are unsatisfactory as solvents for the practice of my invention because (1) they are not inert in the reaction and (2) the product is soluble in alcohols. Accordingly alcohols are excluded from the scope of my invention.

While diethyl ether is the preferred solvent for use in the laboratory, in commercial practice a higher-boiling ether such as dibutyl ether or diamyl ether may be preferred because of its lower volatility and consequent lower losses in the plant.

The solvent employed is preferably one which is volatile so that it may readily be removed from the recovered product in a simple and economical manner for example by evaporation at room or moderately elevated pressure.

Any primary or secondary alkyl or cycloalkyl amine may be employed. In other words the groups R and R' attached to nitrogen in the amine and in the product may be either alkyl or cycloalkyl groups and they may be either the same or different. Examples of suitable amines are: methyl, ethyl, propyl, butyl and higher alkyl amines, dimethyl, diethyl, dipropyl, dibutyl and higher dialkyl amines, mixed alkyl amines such as methyl ethyl amine, ethyl propyl amine; cycloalkyl amines such as cyclohexyl amine, cyclopentyl amine; mixed alkyl and cycloalkyl amines such as cyclohexyl methyl amine; etc. Heterocyclic amines which are secondary such as morpholine and piperidine are also very satisfactory. The amine employed may be water-soluble or water-insoluble. Thus water-insoluble amines such as cyclohexyl amine or dicyclohexyl amine may be employed to produce the corresponding N-substituted alkali metal dithiocarbamates in substantially quantitative yields.

The alkali metal hydroxide may be introduced in any suitable form. However, I much prefer to employ it in the form of an aqueous solution of substantial concentration say from 10 to 40 per cent by weight. Although the aqueous solution of the alkali metal hydroxide initially forms a separate phase, this solution apparently dissolves to a limited extent in the solution of the amine and carbon disulfide in the organic solvent even at the outset. This limited dissolution of alkali in the organic solvent phase appears to be essential in order that the desired reactions may take place.

While sodium hydroxide is preferred from the standpoints of cheapness and availability hydroxides of other alkali metals such as potassium or lithium may be employed.

The alkali metal hydroxide is preferably introduced into the system in concentrated aqueous solution, say about 30 per cent by weight, and during the first stage of the reaction remains in a separate phase. However, with efficient stirring, the reaction proceeds smoothly and the aqueous phase disappears. While the exact manner in which the water is retained is not clear, it is possible that all or most of it is dissolved in the solvent medium or that a portion of it may be utilized as water of hydration in the crystals formed. In any case, the N-substituted alkali metal dithiocarbamate is precipitated in crystalline form in almost theoretical yield and upon removal appears to be substantially dry.

The general procedure of carrying out the present invention involves first forming a solution of the amine and carbon disulfide in the organic solvent, this usually being done by commingling a solution of the amine in a portion of said solvent with a solution of the carbon disulfide in the balance of said solvent, adding to this resulting solution an aqueous solution of the alkali metal hydroxide, agitating the resulting mixture vigorously to promote intimate contacting between the solvent phase and the aqueous phase while holding at a temperature of from 10 to 40° C. for from 45 minutes to two hours, at the end of which time the aqueous phase has disappeared and the product has been precipitated in good yield, and then recovering the precipitated product in any suitable manner as for example by simple filtration. The product may be recrystallized as from alcohol if desired to increase its purity.

The advantages of the present process will be further clarified by an explanation of the accompanying diagram in which is shown one specific embodiment of the present process. In order to simplify the explanation specific compounds are mentioned as feed stocks and products. Such mode of explanation is not intended as limiting in any manner to the scope of the disclosure. Now referring to the drawing, an amine is drawn from storage 1 through line 2 to mixing chamber 3 where it is commingled with solvent conveyed from storage 4 via line 5 containing valve 6. The mixture is discharged through line 7 containing valve 8 to reactor 9. Concurrently carbon disulfide from storage 10 is passed through line 11 to mixing chamber 12 where it is commingled with solvent from line 5—A containing valve 13 or from recycle line 14 from the solvent recovery system 15. The carbon disulfide solution is discharged through line 16 containing valve 17 to reactor 9 where it is combined with the amine solution from line 7 by the action of mechanical stirrer 18. Sodium hydroxide from caustic storage 19 is admitted to reactor 9 via line 20 containing valve 21. The reactants are kept vigorously stirred in the reactor which, since the interaction of amines with carbon disulfide is strongly exothermic, is cooled by water jacketing, cooling coils, or other suitable means.

When the reactor 9 is filled the flow of reactants is diverted to reactor 22 by closing valves 8, 17 and 21 and opening valves 23, 24 and 25. The reaction in reactor 9 is permitted to continue for about 60 minutes while reactor 22 is being filled. At the end of the reaction period valve 26 is opened and the contents, comprising a slurry of N-substituted sodium dithiocarbamate in solvent together with small amounts of unreacted carbon disulfide, discharged via line 27 to separator 28, which may be a stationary or centrifugal type filter. The crystalline salt is removed through discharge tube 29 and the solvent discharged via line 30 to solvent recovery system 15. The recovered solvent, usually containing small amounts of unchanged carbon disulfide is conveyed through recycle line 14 to be recombined with the feed to the reactors. Impurities, water, and other extraneous materials removed in the solvent recovery process are removed from the system via line 31. When steady conditions have been established, further addition of solvent to the system will be confined to makeup only, which will preferably be introduced into the amine feed, valve 13 to the carbon disulfide stream being closed.

The amount of solvent employed will usually be between four and eight parts by weight to one part by weight combined amine and carbon disulfide, preferably between 5 and 6 parts to one. Very low solvent to reactant ratios often result in clogged lines, incomplete reactions and other difficulties, while too great an amount of solvent contributes no appreciable advantage and adds substantially to solvent recovery costs.

The ratio of reactants will usually be about mol for mol, although a slight excess of carbon disulfide, say about 5 to 15 per cent over theoretical may be desirable in some instances. When operating according to my continuous process unchanged carbon disulfide is recycled to the reaction with recovered solvent and losses are confined to those resulting from mechanical sources.

The temperature in the reaction zone should be maintained between 10 and 40° C., preferably between 20 and 30° C. Residence time will be between 45 minutes and 2 hours. Efficient stirring of reactants is essential to obtain complete conversion and a desirable product.

In an alternative embodiment of the present process, completely continuous flow is maintained by feeding the reactants into the first reactor with which the second is connected in series, thus providing a means for prolonging the reaction time within a continuously flowing system before removing the effluent to the separator. Such method of operation is often advantageous and is within the scope of this disclosure.

While I have preferred to operate my process in a continuous manner, the method involved is adaptable for the batchwise production of N-substituted dithiocarbamates when desired, say for small scale operation, and the herein disclosed procedure does not exclude such method.

*Example I*

Thirty cubic centimeters (¼ mol) of cyclohexyl amine was dissolved in 170 cc. of diethyl ether and to this mixture was added 25 cc. carbon disulfide mixed with 80 cc. ether, the addition being made slowly with sufficient stirring. To this mixture was added 37 grams of 30 per cent sodium hydroxide solution. The reactants were maintained at a temperature of 30° C. for 1½ hours with continued stirring. Shortly after the mixing of the reactants a white powdery precipitate of cyclohexyl ammonium dithiocarbamate was observed. As the reaction progressed this precipitate changed from the white powder first observed to needle-like crystals of sodium cyclohexyl dithiocarbamate. These were removed by filtration and recrystallized from isopropyl alcohol. The yield of crude sodium salt was 47 grams, representing a yield of 96 per cent of theory. The recrystallized product had a melting point of 250° C. and was soluble in water and alcohol.

*Example II*

The sodium salt of morpholine dithiocarbamate was prepared in the manner described above using 10 grams of morpholine dissolved in acetone and 8.7 grams of carbon disulfide in 100 cc. of the same solvent. The carbon disulfide solution was added to the morpholine solution slowly with stirring after which 10 cc. of 30 per cent sodium hydroxide was added. After stirring for 1½ hours the mixture was filtered to yield 19 grams of crude morpholine sodium dithiocarbamate. The product was recrystallized from alcohol to provide a fine white powder, soluble in water and alcohol.

*Example III*

A solution comprising 15 weight per cent of cyclohexyl amine in diethyl ether was prepared and fed to a stirred reactor of the type shown in the accompanying diagram. After the amine feed had been started, a stream comprising a mixture of carbon disulfide in six parts by weight of diethyl ether was introduced into the reactor in a manner such that approximately 1.1 mols of carbon disulfide was added for each mol of amine. A thirty per cent aqueous solution of sodium hydroxide was added to the reactants at a rate such that the ratio of hydroxide to amine was substantially mol for mol. When the reactor was filled, the feed was interrupted and stirring continued for sixty minutes after which the mixture comprising a slurry of crystalline cyclohexyl sodium dithiocarbamate was discharged to a filter. The solvent was separated and fractionated for recycling to the feed preparation and the crystalline product removed for recrystallization.

I claim:

1. A method for producing an alkali metal salt of an N-substituted dithiocarbamic acid which comprises contacting an amine selected from the group consisting of primary and secondary alkyl, cycloalkyl, and heterocyclic amines with carbon disulfide in the presence of a 10 to 40 weight per cent aqueous solution of an alkali metal hydroxide while both said amine and said carbon disulfide are in solution in a neutral organic solvent which is chemically inactive with respect to the reactants and the product, which has a solubility for at least 0.5 per cent water, and in which the product alkali metal salt of the N-substituted dithiocarbamic acid is substantially insoluble and thereby effecting formation and precipitation of said alkali metal salt of the N-substituted dithiocarbamic acid, utilizing during the course of the reaction 4 to 8 parts by weight of solvent per part of combined amine and carbon disulfide and about one mol of alkali metal hydroxide per mol of amine.

2. The method of claim 1 wherein said solvent is an aliphatic ether.

3. The method of claim 1 wherein said solvent is diethyl ether.

4. The method of claim 1 wherein said solvent is dibutyl ether.

5. The method of claim 1 wherein said solvent is diisopropyl ether.

6. The method of claim 1 wherein said amine is cyclohexyl amine.

7. The method of claim 1 wherein said amine is morpholine.

8. The method of claim 1 wherein said amine and carbon disulfide and alkali metal hydroxide are employed in substantially equimolar proportions.

9. The method of claim 1 wherein said reaction mixture is maintained at a temperature of from 10 to 40° C. for a time of between 45 minutes and 2 hours.

10. The method of claim 1 wherein the weight ratio of said solvent to the combined amine and carbon disulfide is between 5:1 and 6:1.

11. A method for producing an alkali metal salt of an N-substituted dithiocarbamic acid which comprises commingling an amine selected from the group consisting of primary and secondary alkyl, cycloalkyl, and secondary heterocyclic amines with carbon disulfide while both said amine and said disulfide are in solution in a mutual organic solvent which is chemically inactive with respect to the reactants and the product which has at least a limited solubility for water and in which the product alkali metal salt of the N-substituted dithiocarbamic acid is substantially insoluble in the presence of a 10 to 40 weight per cent aqueous solution of an alkali metal hydroxide, said solvent being capable of dissolving at least 0.5 per cent of water at room temperature, said aqueous solution of an alkali metal hydroxide initially forming a separate aqueous phase which disappears as the reaction proceeds, said alkali metal hydroxide being added in a ratio of about 1 mol per mol of amine, vigorously agitating the reaction mixture during the reaction, thereby effecting formation and precipitation of said alkali metal salt of the N-substituted dithiocarbamic acid, utilizing during the course of the reaction 4 to 8 parts by weight of solvent per combined part by weight of amine and carbon disulfide and recovering said salt as product from the resulting reaction mixture.

12. A method for producing an alkali metal salt of an N-substituted dithiocarbamic acid which comprises commingling an amine selected from the group consisting of primary and secondary alkyl, cycloalkyl, and heterocyclic amines with carbon disulfide in the presence of an aqueous solution of an alkali metal hydroxide of at least 30% concentration while both said amine and said carbon disulfide are in solution in a mutual organic solvent, said alkali metal hydroxide being used in an amount of about 1 mol per mol of amine, said solvent dissolving at least 0.5% of water at 20° C. and in which the product alkali metal salt of the N-substituted dithiocarbamic acid is substantially insoluble, utilizing during the course of the reaction 5 to 6 parts by weight solvent per part of combined amine and carbon disulfide and thereby effecting formation and precipitation of an alkali metal salt of an N-substituted dithiocarbamic acid.

13. A method for producing the sodium salt of an N-substituted dithiocarbamic acid which comprises admixing cyclohexyl amine dissolved in a portion of diethyl ether solvent with carbon disulfide dissolved in the balance of said solvent, the mol ratio of amine to carbon disulfide being 1:1 and the amount of solvent being 5–6 parts by weight per part of combined cyclohexyl amine and carbon disulfide, adding to the prepared admixture one mol of sodium hydroxide in a 30 weight per cent aqueous solution per mol of amine, reacting said materials at a temperature of 20 to 30° C., a contact time of 60 minutes and with vigorous agitation and thereby effecting formation and precipitation of sodium cyclohexyl dithiocarbamate, and separating said sodium cyclohexyl dithiocarbamate by filtration and recovering same as product of the process.

14. A method for producing an alkali metal salt of an N-substituted dithiocarbamic acid, which comprises admixing an amine selected from the group consisting of primary and secondary alkyl, cycloalkyl, and heterocyclic amines dissolved in a portion of an organic solvent chemically inert with respect to the reaction with carbon disulfide dissolved in the balance of said solvent, said solvent being capable of dissolving at least 0.5 per cent water at room temperature and in which the product is insoluble, the mol ratio of amine to carbon disulfide being in the range of 1:1 to 1:1.15 and the ratio of solvent to combined amine and carbon disulfide being 4:1 to 8:1 parts by weight, adding to the admixture 0.9 to 1.12 mols of alkali metal hydroxide in a 10 to 40 weight per cent aqueous solution per mol of amine, reacting said materials at a temperature in the range of 10 to 40° C., a contact time of 45 minutes to 2 hours, with agitation, and thereby effecting formation and precipitation of the alkali metal salt of an N-substituted dithiocarbamic acid.

WILLIE W. CROUCH.

REFERENCES CITED

The following references are of record in the file of this patent:

UNITED STATES PATENTS

| Number | Name | Date |
| --- | --- | --- |
| 2,265,851 | Matheson | Dec. 9, 1941 |
| 2,400,934 | Jones | May 28, 1946 |

OTHER REFERENCES

Whitby et al.: Transactions Royal Soc. Canada, vol. 18, sect. III (1924), pp. 111 to 114.

Certificate of Correction

Patent No. 2,563,007                                August 7, 1951

WILLIE W. CROUCH

It is hereby certified that error appears in the printed specification of the above numbered patent requiring correction as follows:

Column 1, line 5, after "acids" strike out ", are of increasing importance" and insert instead *from selected primary and*; column 6, line 22, for "sufficient" read *efficient*;

and that the said Letters Patent should be read as corrected above, so that the same may conform to the record of the case in the Patent Office.

Signed and sealed this 25th day of December, A. D. 1951.

[SEAL]

THOMAS F. MURPHY,
*Assistant Commissioner of Patents.*